United States Patent [19]
Rowe

[11] Patent Number: 5,838,303
[45] Date of Patent: Nov. 17, 1998

[54] CONTINUOUS LOOP MOUSE

[76] Inventor: David G. Rowe, 12901 Ceder St., Leawood, Kans. 66209

[21] Appl. No.: 716,023

[22] Filed: Sep. 19, 1996

[51] Int. Cl.⁶ .................................................... G09G 5/08
[52] U.S. Cl. ........................... 345/157; 345/156; 345/184
[58] Field of Search .................................. 345/156, 157, 345/163, 164, 167, 184; 74/471 XY; 273/478

[56] References Cited

U.S. PATENT DOCUMENTS

| | | | |
|---|---|---|---|
| 5,270,690 | 12/1993 | Oberg | 345/163 |
| 5,291,213 | 3/1994 | Krauss | 345/164 |
| 5,442,377 | 8/1995 | Rowe | 345/165 |
| 5,479,190 | 12/1995 | Rowe | 345/156 |
| 5,493,314 | 2/1996 | Rowe | 345/156 |

*Primary Examiner*—Mark R. Powell
*Assistant Examiner*—Matthew Luu
*Attorney, Agent, or Firm*—Richard P. Stitt

[57] ABSTRACT

A sphere cage and carousel wheel assembly are provided which convert user applied force into rotational movement of the carousel to guide and support the movement through curves of an annular array of spheres composing the loop mechanism of a continuous loop mouse or position control device for use with a pointing device of a computer screen or other graphical user interface.

9 Claims, 3 Drawing Sheets

CONTINUOUS LOOP MOUSE

BACKGROUND OF THE INVENTION

This invention relates to improvements in a continuous loop mouse of the general type described in U.S. Pat. Nos. 5,442,377, 5,479,190 and 5,493,314 and which patents are incorporated herein by reference thereto. In particular, the present invention relates to an improved support cage or track and an indexing wheel with, and without x-axis movement detection, which reduce frictional forces to enable ease of loop movement and increased loop movement detection sensitivity.

The typical devices currently used for computer screen cursor or pointing control consist of mouse-type and trackball-type and joystick-type control devices. The mouse-type and trackball-type devices utilize an individual sphere which is supported on bearings to permit rotation of the sphere in any direction. The motion detection components are biased against the sphere to permit detection of sphere movement. The sphere movement is converted into X-axis and Y-axis components which are then utilized to reposition a pointing device or cursor on a computer screen or other graphical user interface device. Devices in which the sphere is enclosed in a housing so that the sphere travels in contact with a surface while the housing manipulated by a user are denominated as mouse-type devices. Devices in which the housing supports the sphere for direct manipulation by a user are generally referred to as trackball-type devices.

A third type of device has become prominent with laptop computers which consists of a "joystick" projecting from the center of the keyboard. The joystick is mobile about a central pivot axis. The joystick movement is converted into X-axis and Y-axis components which are then communicated to a pointing device or cursor on a computer screen or other graphical user interface to reposition the pointing device.

The problems associated with the first two devices—the mouse and the trackball—have been discussed in U.S. Pat. Nos. 5,442,377, 5,479,190 and 5,493,314. The problems associated with the joystick-type device are mainly related to the short range of motion, or short throw, presented by the small joystick which projects from the keyboard. The user must develop an ability to make very fine manipulations of the joystick or the user will constantly over-shoot the desired location when repositioning the pointer on the computer screen. The advantage of the joystick device is that the user does not have to lift the hands from the keyboard as with the mouse or the trackball.

The embodiments described in U.S. Pat. Nos. 5,442,377, 5,479,190 and 5,493,314 provide a useful alternative to the above devices and have the advantage of being located on the keyboard so the user does not have to lift the hands from the keyboard. In addition, these devices are superior to the joystick as a greater range of movement is available to the user so the problems associated with the joystick devices are not present.

However, in one embodiment of the type of inventions shown in U.S. Pat. Nos. 5,442,377, 5,479,190 and 5,493,314—the annular array of multiple spheres embodiments—the movement of the spheres by the user requires that the spheres be pressed around two curves in order to provide the continuous loop aspect of the device. While operating as intended, the pushing of the spheres through the two curved portions of the housing results in frictional drag against the track sides and the side to side close contact between the spheres reduces the rolling ability of the spheres. These two attributes increase the amount of lateral force required from the user in order to manipulate the spheres into new positions.

Therefore, it will be appreciated that the need is present for an improvement to the annular array of multiple spheres which reduces this frictional inhibition to sphere movement at the curved sections of the housing and reduces the amount of lateral force which a user must provide in order to push the spheres through the two curved portions of the track. In addition the need is present to reduce the frictional resistance and reduce the needed user-provided lateral force in order to increase control of sphere movement and thereby increase sensitivity of the detection apparatus for the repositioning of a cursor laterally or in the direction of the X-axis.

SUMMARY OF THE INVENTION

The objectives of the present invention include providing a multi-axis cursor or pointer control device which operates from a fixed location thereby avoiding the need to move the control device location to effect signal generation and which contains the improvement of reducing friction between the sphere and the sides or walls of a guide-track during the movement of a sphere around the curved portions of the path of travel;

Another objective of the present invention is to reduce the amount of user applied lateral force need to operate the movement of an annular array of spheres through the curved portions of a path of travel in order to provide movement of the entire annular array of spheres.

Yet another objective of the present invention is to direct the user applied lateral force to a mechanism which assists in carrying the spheres through the curved portions of the path of travel and thereby reduces the frictional resistance resulting from adjacent spheres rotating against one another.

Another objective of the present invention is to provide a mechanism which serves to carry each sphere of the annular array through the arc of the curved portions of the path of travel in order to reduce the amount of user applied lateral force needed to operate the movement of an annular array of spheres through the curved portions of the path of travel in order to increase user control over sphere movement and increase detector sensitivity to sphere lateral movement.

Still another objective of the present invention is to direct the user applied lateral force into a carousel mechanism to serve to carry each sphere of the annular array through the arc of the curved portions of the path of travel in order to reduce the amount of user applied lateral force needed to operate the movement of an annular array of spheres through the curved portions of the path of travel in order to increase user control over sphere movement and increase detector sensitivity to sphere lateral movement.

These objectives and advantages are obtained by an improvement in a position control device for a graphical user interface pointing device, the control device of the type having a plurality of spheres in a housing for supporting the spheres in adjacent annular array the housing having a window therein to permit a user to apply lateral force on, at least, on of the spheres for communication of the force to the plurality of spheres to accomplish lateral movement of the spheres, the improvement comprising a carousel wheel rotatable about a central axis the wheel having sphere-accepting indents to receive a sphere forced by a user against the wheel orthogonally to the wheel central axis, the indents receiving and communicating the user-applied force from the sphere to the axis to rotate the wheel to direct the movement of the indent-received sphere through the arc of a curve defined by the rotation of the wheel on the axis and to deposit the sphere at an opposite end of the arc from where the sphere was received by the indent, and an apron extending outwardly from the wheel central axis to support the sphere received by the wheel indent, the apron to receive and support the sphere during the movement of the sphere by the wheel, a sphere-directing rail for defining a generally elliptical path of sphere travel to direct the sphere travel toward a first carousel wheel positioned at a first curve of the elliptical path for travel of the sphere through an arc defined by the rotation of the first wheel and the rail to then receive the arc-traveled sphere and to direct the received-sphere toward a second carousal wheel positioned at a second curve of the elliptical path for travel of the sphere through an arc defined by the rotation of the second wheel. In this improved device the sphere-directing rail can comprise a first rail spaced outwardly from a second rail for containing the sphere therebetween to direct the path of sphere travel.

The foregoing and other objects are not meant in a limiting sense, and will be readily evident upon a study of the following specification and accompanying drawings comprising a part thereof. Other objects and advantages of this invention will become apparent from the following description taken in connection with the accompanying drawings, wherein is set forth by way of illustration and example, an embodiment of this invention.

BRIEF DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DETAILED DESCRIPTION OF THE PREFERRED EMBODIMENTS

Figure 1:
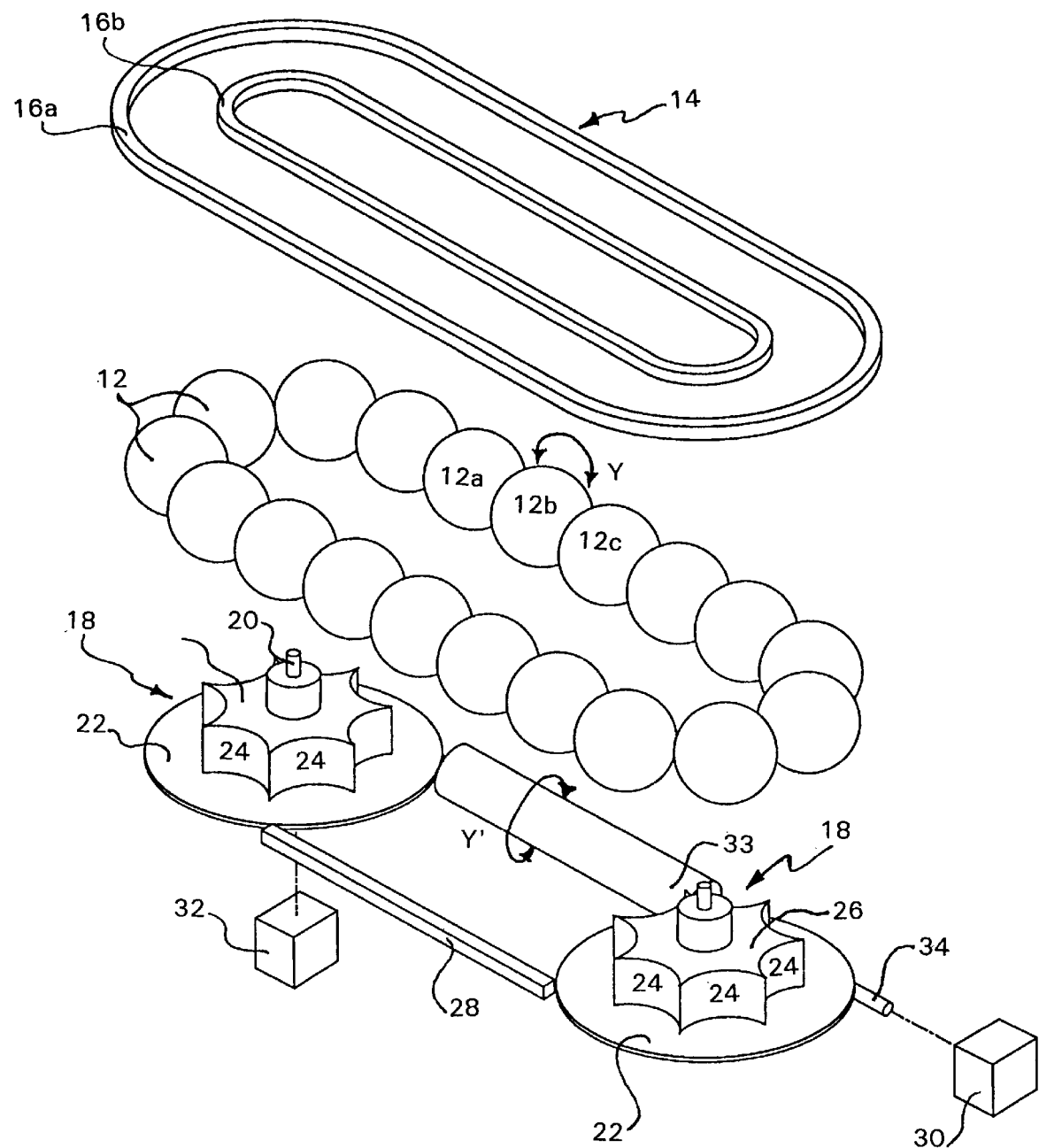
FIG. 1 is an exploded perspective view of the invention showing the interrelationship between the movable spheres, the guide cage, and the carousel wheels.
Figure 2:
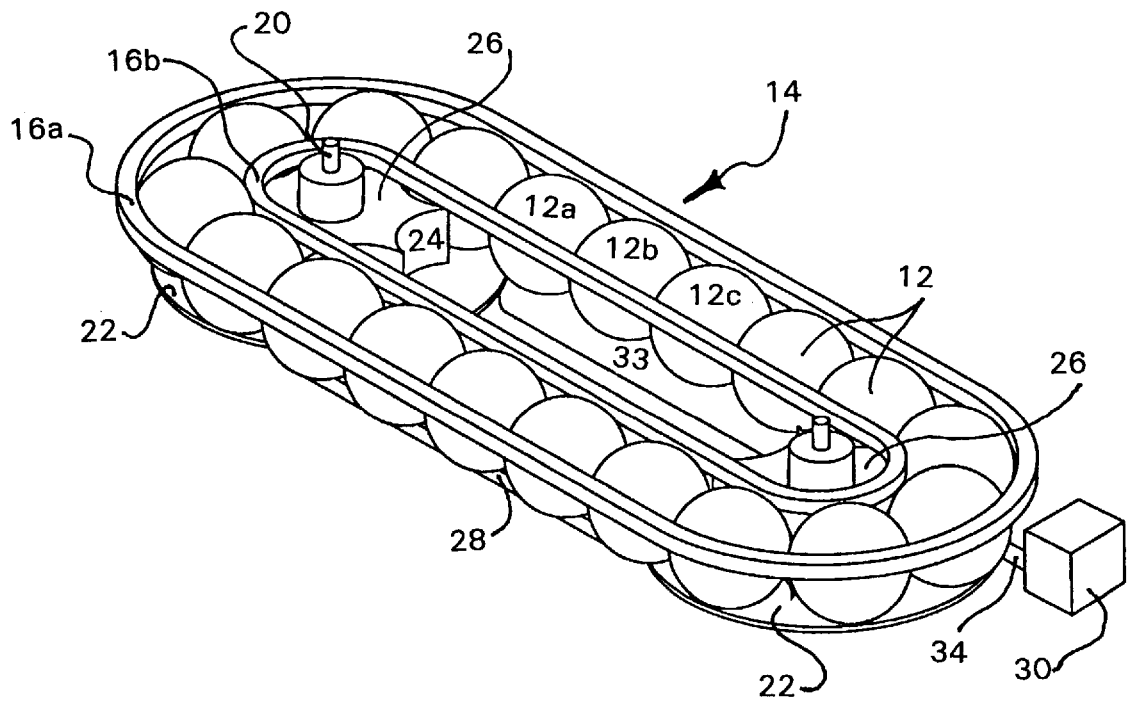
FIG. 2 is a top and right side perspective view of the invention showing the components of FIG. 1 in assembled array.

Referring first to FIG. 2 the assembled improved continuous loop mouse or circulating-element mouse is shown. The relationship of the component parts is better realized by reference to FIG. 1 which is an exploded view of FIG. 2. In FIG. 1, multiple spheres or balls 12a, 12b, 12c are shown in side-to-side array to form a continuous annular loop. Spheres 12 are contained within cage or track or guide 14 which is composed of inner guide 16b and outer guide 16a. The bottom support or floor of track or cage 14 is formed by different components at different locations along the path traveled by spheres 12. At either of the curved portions of cage 14, bottom support is provided by apron 22 of carousel 18. In the straight portions of cage 14 spheres 12 are supported by guide 28 and motion take-off 33. In this manner spheres 12 are fully supported at all locations within cage or guide 14.

As more fully described in U.S. Pat. Nos. 5,442,377, 5,479,190 and 5,493,314, the environment of the present inventive improvement is to operate to move a pointing device on display screens such as a cathode ray tube (CRT) or other graphical user interface (GUI). This is accomplished by movement of spheres 12 in two directions to affect two sensors or detectors 30, 32. One detector 30 is devoted to movement in the Y-axis or the horizontal plane and the other detector 32 is dedicated to movement in the X-axis or the vertical plane. These detectors operate to sense different movements of spheres 12 in these two directions and communicate this movement to produce a corresponding change in the position of a pointer on a computer display screen or other user interface.

The motion to be detected and communicated to the pointer is produced by a user pushing spheres 12 in one of several directions. In order to achieve vertical pointer movement any of spheres 12a, 12b or 12c are rotated in the directions of Arrow Y which results in rotation of motion take-off 33 in the directions indicated by Arrow Y'. This rotational movement is then communicated to detector 30 by connecting rod 34. The rotational motion is sensed by detector 30 and then, by operations well understood in the art, the rotational movement produces a corresponding movement in the vertical location of a pointer on a computer CRT or the pointer location on some other type of device.

In U.S. Pat. No. 5,442,377, 5,479,190 and 5,493,314 embodiments of the inventive concept were shown therein utilizing an annular array of spheres which operated within an enclosed track. More particularly, spheres 12 are adjacent one another and user lateral pressure applied to one such sphere is communicated to all spheres within the annular ring of spheres. The user applied lateral pressure must be sufficient to overcome the impacts between spheres and the frictional contact of the spheres with the sidewalls of the housing. The passage of the spheres around the curves of the housing and the impacts of the spheres with one another present interfering frictional resistance to smooth passage of the spheres around the path of travel. The present inventive improvement to this embodiment provides for greater freedom of sphere movement, requires less force to be applied by a user and permits greater user fine control to directing the repositioning of a pointer as the lateral movement of the spheres is more easily controlled. The manner by which this improved embodiment is accomplished is described hereinafter.

Referring now to FIG. 1, the components which comprise the improved device are shown in exploded view. An annular array of spheres 12 is arranged such that the spheres are adjacent one another and each spheres is in contact, generally, with the adjacent spheres 12a, 12b, 12c. This enables the entire array of spheres to be laterally moved in an elliptical path by a user pressing against and moving any one of spheres 12 laterally. The improved housing which guides the travel of the spheres 12 is shown in FIG. 1. positioned above spheres 12 and track or cage 14 is comprised of inner guide or track 16b and outer track or guide 16a.

Referring to FIG. 2, the positioning of track or guide 14 with respect to spheres 12 is shown. It can be seen in FIG. 2 that inner guide or track 16b is positioned to the interior of the spheres 12 and track 16a is positioned to contain the outside edge of spheres 12 and to maintain spheres 12 between the space presented by tracks 16a, 16b. In this fashion spheres 12 are directed along the path established by track or guide 14 and the spheres are communicated from a first curve of the elliptical path to a second curved portion in the elliptical path established by track or guide 14.

Referring again to FIG. 1, the components which direct spheres 12 through the arc of the first and second curves of the elliptical path are shown positioned below the annular array of spheres 12. Carousel wheel 18 is positioned at the curve of the elliptical path and generally operates to receive each sphere 12 and to receive the user-applied force to the annular array of spheres 12 and to communicate that force to central wheel axis 20 about which carousel 18 rotates to then carry each sphere 12 through the arc defined by the rotation of carousel 18 and to then deposit each sphere 12 at the opposite end of the arc from where each sphere 12 entered carousel 18. This mechanism will be described in greater detail herein after.

Figure 3:
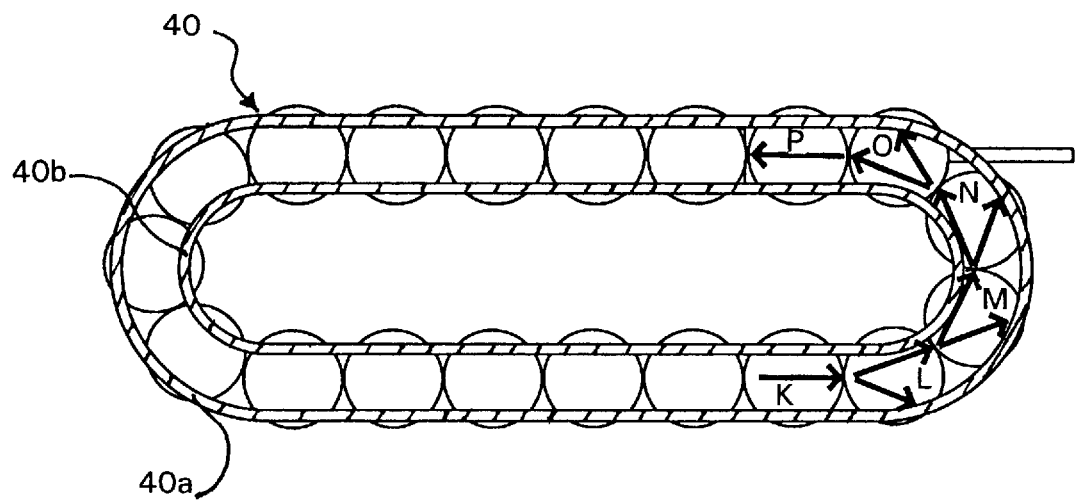
FIG. 3 is a top plan view of the invention showing the force vectors which are generated by the spheres as they are pushed about within a housing.
Figure 4:
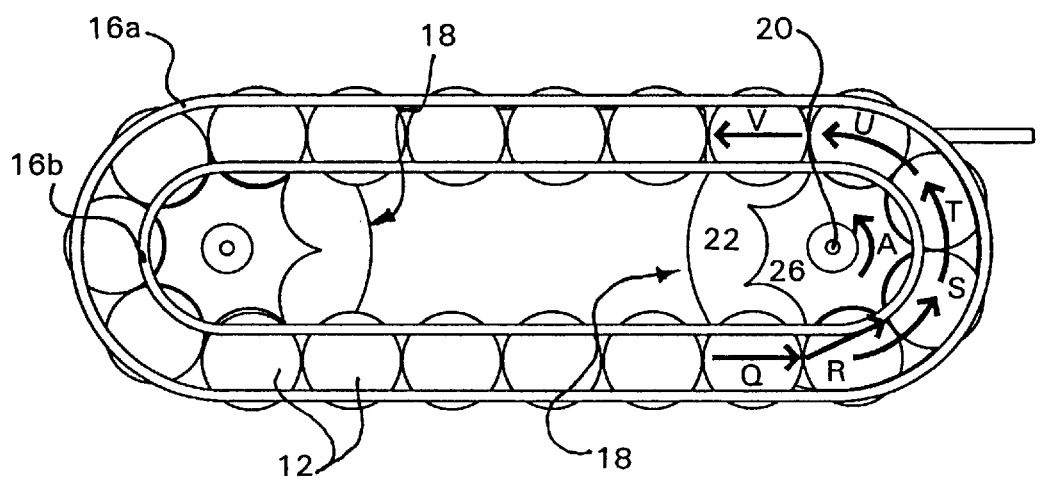
FIG. 4 is a top plan view of the invention showing the modified force vectors which are generated by the spheres as they are pushed about within the guide cage and with the star wheel assembly present.

Referring now to FIGS. 3 and 4 the forces operating during the lateral movement of spheres 12 will be discussed. In FIG. 3 an annular array of spheres is shown within a housing 40, but without any assisting mechanism to enable the spheres to negotiate the two curves present in the elliptical path. As the spheres are pressed laterally in the direction of Arrow K, the sphere enters the curved portion of the elliptical path and the force designated by Arrow K becomes divided into two components as shown by the arrows within sphere L. It can be seen that the force component which is derived from user applied lateral force begins to press into two directions, at least, with a first component being directed against outer wall 40a and the second component of force being directed toward sphere M which is positioned ahead of sphere L in the direction of travel. In like fashion, the forces on sphere M also are directed in two components, an outward component directed against wall 40a and a component directed against sphere N. This division of force continues throughout the path of travel around the curve until the path of travel of the sphere is again in a straight line as represented by sphere P. It is this division of the applied force into different directions which increases the frictional resistance as the spheres travel around the curve and which increases the amount of force required to be applied by a user and which reduces the degree of control which a user has over the movement of spheres 12.

Referring now to FIG. 4, the improved device which overcomes the previously described problems will be discussed. In FIG. 4, carousel wheel 18 is shown in position at the curve of the elliptical path of travel. Carousel wheel 18 is comprised of shoulder 26 and apron 22 both of which act to receive a sphere 12 as it enters the curve of the path of travel and serve to support each sphere and direct the applied force into rotational movement about axis 20 to then carry each sphere 12 on carousel 18 through an arc defined by the path of wheel 18 as it rotates about axis 20.

As a sphere Q enters the curved portion of the path the force is directed in a forward direction. As the sphere advances to the position indicated by sphere R, the force is applied to the projecting portion or leading edge of indent 24 (FIG. 1) and that force is communicated through shoulder 26 of carousel 18 and rotates carousel wheel 18 about axis 20. The communicated force serves to rotate carousel wheel 18 and to carry sphere R through successive positions S, T, U and to deposit the sphere at position V in the straight portion of the elliptical path. As indicated in FIG. 4, the user-applied forces first encountered by wheel 18 are in the direction shown by the arrow on sphere Q and then at sphere R the forces are accepted by indent 24 on shoulder 26 and cause wheel 18 to rotate in the direction of Arrow A about axis 20.

Referring now to FIG. 1, the configuration of carousel wheel 18 will be described detail. Carousel wheel 18 has shoulder 26 which extends from and rotates about a central axis 20. The outer circumference of shoulder 26 is provided with indents 24 which in one embodiment are curved to receive a sphere 12 into the depression of indent 24. The projecting edges of indents 24 accept the user-applied forces from spheres 12 as the spheres are received into indent 24. This force is then passed on by shoulder 26 to cause rotation of wheel 18 about axis 20. Apron 22 extends outwardly from shoulder 26 to extend under and support sphere 12 as it enters indent 24 of shoulder 26. Apron 22 assists in the reduction of frictional forces by supporting and carrying sphere 12 in conjunction with shoulder 26 and guide 14 along the path of the arc defined by the rotation of wheel 18.

In FIG. 1, it is shown that one such wheel 18 is connected to detector 32 which senses the direction and amount of rotation of wheel 18 and converts that information into a signal for communication to a pointing device for repositioning of the pointing device along the X-axis of the CRT or other interface device. In the manner as previously described in U.S. Pat. Nos. 5,442,377, 5,479,190 and 5,493, 314 the rotation of any of spheres 12a, 12b, or 12c in the direction of Arrow Y causes rotation of take-off 33 in the directions indicated by Arrow Y'. This rotation is communicated to detector 30 by shaft 34 to permit detector 30 to sense the direction and amount of rotation of take-off 33. This information is then converted into a signal for communication to a pointing device for repositioning of the pointing device along the Y-axis of the interface device.

In the foregoing description, certain terms have been used for brevity, clearness and understanding, but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the improved continuous loop mouse or circulating-element mouse is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed as new and desired to be secured by Letters Patent is as follows:

1. An improvement in a position control device for a graphical user interface pointing device, the control device of the type having a plurality of spheres in a housing for supporting the spheres in adjacent annular array, the housing having a window therein to permit a user to apply lateral force on at least one of the spheres for communication of the force to the plurality of spheres to accomplish lateral movement of the spheres the improvement comprising:

a carousel wheel rotatable about a central axis said wheel having sphere-accepting indents to receive a sphere forced by a user against said wheel orthogonally to said wheel central axis, said indents receiving and communicating said user force from said sphere to said wheel to rotate said wheel about said axis to direct the movement of said indent-received sphere about the arc of a curve defined by the rotation of said wheel on said axis and to deposit said sphere at an opposite end of said arc from where said sphere was received by said indent.

2. The device as claimed in claim 1 further comprising an apron extending outwardly from said wheel central axis to support said sphere received by said wheel indent, said apron to receive and support said sphere during the movement of said sphere by said wheel.

3. The device as claimed in claim 1 further comprising a sphere-directing rail for defining a generally elliptical path of sphere travel to direct said sphere travel toward a first carousel wheel positioned at a first curve of said elliptical path for travel of said sphere through an arc defined by the rotation of said first wheel and said rail to then receive said arc-traveled sphere and to direct said received sphere toward a second carousel wheel positioned at a second curve of said elliptical path for travel of said sphere through an arc defined by the rotation of said second wheel.

4. The improved device as claimed in claim 3 wherein said sphere-directing rail comprises a first rail space outwardly from a second rail for containing said sphere therebetween to direct the path of sphere travel.

5. An improvement in a position control device for a graphical user interface pointing device, the control device of the type having a plurality of spheres in a housing for supporting the spheres in adjacent annular array the housing having a window therein to permit a user to apply lateral force on at least on of the spheres for communication of the force to the plurality of spheres to accomplish lateral movement of the spheres the improvement comprising:

a carousel wheel rotatable about a central axis, said wheel having sphere-accepting indents to receive a sphere forced by a user against said wheel orthogonally to said wheel central axis, said indents receiving and communicating said user force from said sphere to said wheel to rotate said wheel about said axis to direct the movement of said indent-received sphere about the arc of a curve defined by the rotation of said wheel on said axis and to deposit said sphere at an opposite end of said arc from where said sphere was received by said indent, and an apron extending outwardly from said wheel central axis, said apron to receive and support said indent-received sphere during the movement of said sphere by said wheel.

6. The device as claimed in claim 5 further comprising a sphere-directing rail for defining a generally elliptical path of sphere travel to direct said sphere travel toward a first carousel wheel positioned at a first curve of said elliptical path for travel of said sphere through an arc defined by the rotation of said first wheel and said rail to then receive said arc-traveled sphere and to direct said received sphere toward a second carousal wheel positioned at a second curve of said elliptical path for travel of said sphere through an arc defined by the rotation of said second wheel.

7. The device as claimed in claim 6 wherein said sphere-directing rail comprises a first rail space outwardly from a second rail for containing said sphere therebetween to direct the path of sphere travel.

8. An improvement in a position control device for a graphical user interface pointing device, the control device of the type having a plurality of spheres in a housing for supporting the spheres in adjacent annular array the housing having a window therein to permit a user to apply lateral force on at least on of the spheres for communication of the force to the plurality of spheres to accomplish lateral movement of the spheres the improvement comprising:

a carousel wheel rotatable about a central axis said wheel having sphere-accepting indents to receive a sphere forced by a user against said wheel orthogonally to said wheel central axis, said indents receiving and communicating said user force from said sphere to said wheel to rotate said wheel about said axis to direct the movement of said indent-received sphere about the arc of a curve defined by the rotation of said wheel on said axis and to deposit said sphere at an opposite end of said arc from where said sphere was received by said indent, and an apron extending outwardly from said wheel central axis to support said sphere received by said wheel indent, said apron to receive and support said sphere during the movement of said sphere by said wheel, a sphere-directing rail for defining a generally elliptical path of sphere travel to direct said sphere travel toward a first carousel wheel positioned at a first curve of said elliptical path for travel of said sphere through an arc defined by the rotation of said first wheel and said rail to then receive said arc-traveled sphere and to direct said received sphere toward a second carousal wheel positioned at a second curve of said elliptical path for travel of said sphere through an arc defined by the rotation of said second wheel.

9. The device as claimed in claim 8 wherein said sphere-directing rail comprises a first rail space outwardly from a second rail for containing said sphere therebetween to direct the path of sphere travel.

* * * * *